United States Patent
Moll

(10) Patent No.: US 7,404,044 B2
(45) Date of Patent: Jul. 22, 2008

(54) SYSTEM AND METHOD FOR DATA TRANSFER BETWEEN MULTIPLE PROCESSORS

(75) Inventor: Laurent Moll, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 326 days.

(21) Appl. No.: 10/941,172

(22) Filed: Sep. 15, 2004

(65) Prior Publication Data

US 2006/0059315 A1   Mar. 16, 2006

(51) Int. Cl.
   *G06F 12/00* (2006.01)
   *G06F 12/14* (2006.01)
(52) U.S. Cl. ............... 711/141; 711/3; 711/119; 711/120; 711/146; 711/148; 711/149
(58) Field of Classification Search .......... 711/3, 711/119, 120, 146, 148, 149, 141
See application file for complete search history.

(56) References Cited

U.S. PATENT DOCUMENTS

| 2004/0039880 A1* | 2/2004 | Pentkovski et al. ......... 711/146 |
| 2005/0160235 A1* | 7/2005 | Steely et al. ................. 711/144 |

\* cited by examiner

*Primary Examiner*—Hyung Sough
*Assistant Examiner*—Mardochee Chery
(74) *Attorney, Agent, or Firm*—Garlick Harrison & Markison; Bruce E. Garlick

(57) ABSTRACT

A system and method are provided for increasing the number of processors on a single integrated circuit to a number that is larger than would typically be possible to coordinate on a single bus. In an embodiment of the present invention a two-level memory coherency scheme is implemented for use by multiple processors operably coupled to multiple buses in the same integrated circuit. A control device, such as node controller, is used to control traffic between the two coherency levels. In an embodiment of the invention the first level of coherency is implemented using a "snoopy" protocol and the second level of coherency is a directory-based coherency scheme.

21 Claims, 5 Drawing Sheets

SYSTEM AND METHOD FOR DATA TRANSFER BETWEEN MULTIPLE PROCESSORS

BACKGROUND OF THE INVENTION

1. Field of the Invention

The present invention is directed in general to data communications. In one aspect, the present invention relates to a method and system for improving data transfer between a plurality of processors on a single integrated circuit.

2. Related Art

As is known, communication technologies that link electronic devices may use multiprocessor switching devices to route and process signal information. Some communication technologies interface a one or more processor devices for processing packet-based signals in a network of computer systems. Generally, packets are used to communicate among networked computer and electronic systems. Thus, each networked system must receive and transmit packets, and must process the packets directed to that system to determine what is being transmitted to that system.

Typically, each computer system includes one or more interfaces or ports on which packets are transmitted and received. Additionally, each interface generally includes a dedicated DMA engine used to transmit received packets to memory in the system and to read packets from the memory for transmission. If a given system includes two or more packet interfaces, the system includes DMA engines for each interface. Where a computer system processes multiple packet channels using the DMA engines, the processor(s) in the system must be able to monitor the status of the DMA transfers for each channel and other system-related functions associated with the channel transfers.

As the number of processors incorporated into a multiprocessor integrated circuit increases, it is difficult to manage data traffic between the processors on a single bus running certain protocols, such as a "snoopy" protocol. In particular, it is difficult to maintain a coherent memory architecture beyond a certain number of processors because such bus structures do not scale well. In view of the foregoing, there is a need for a method and apparatus for improving management of data exchanged between processors in a multiprocessor integrated circuit.

SUMMARY OF THE INVENTION

In accordance with the present invention, an integrated circuit system and method are provided for increasing the number of processors on a single integrated circuit to a number that is larger than would typically be possible to coordinate on a single bus. In the present invention a two-level memory coherency scheme is implemented for use by multiple processors operably connected to multiple buses in the same integrated circuit. A control device, such as node controller, is used to control traffic between the two coherency levels. In one embodiment of the invention the first level of coherency is implemented using a "snoopy" protocol and the second level of coherency is a directory-based coherency scheme. In some embodiments of the invention, the directory-based coherency scheme is implemented using a centralized memory and directory architecture. In other embodiments of the invention, the second level of coherency is implemented using distributed memory and a distributed directory.

In another alternate embodiment of the invention, first and second level coherency schemes are implemented to increased the number of processors that can be implemented in a single integrated circuit and a third coherency scheme is implemented to define a coherent memory boundary with memory in an external integrated circuit. In this embodiment of the invention, various coherency protocols can be implemented at each of the levels. In one alternative embodiment, the first coherency level is implemented using a "snoopy" protocol and the second and third coherency levels are implemented using directory-based protocols. The directory-based protocols can be implemented using centralized memory with a centralized directory or using distributed memory and a distributed directory.

DETAILED DESCRIPTION

Figure 1:
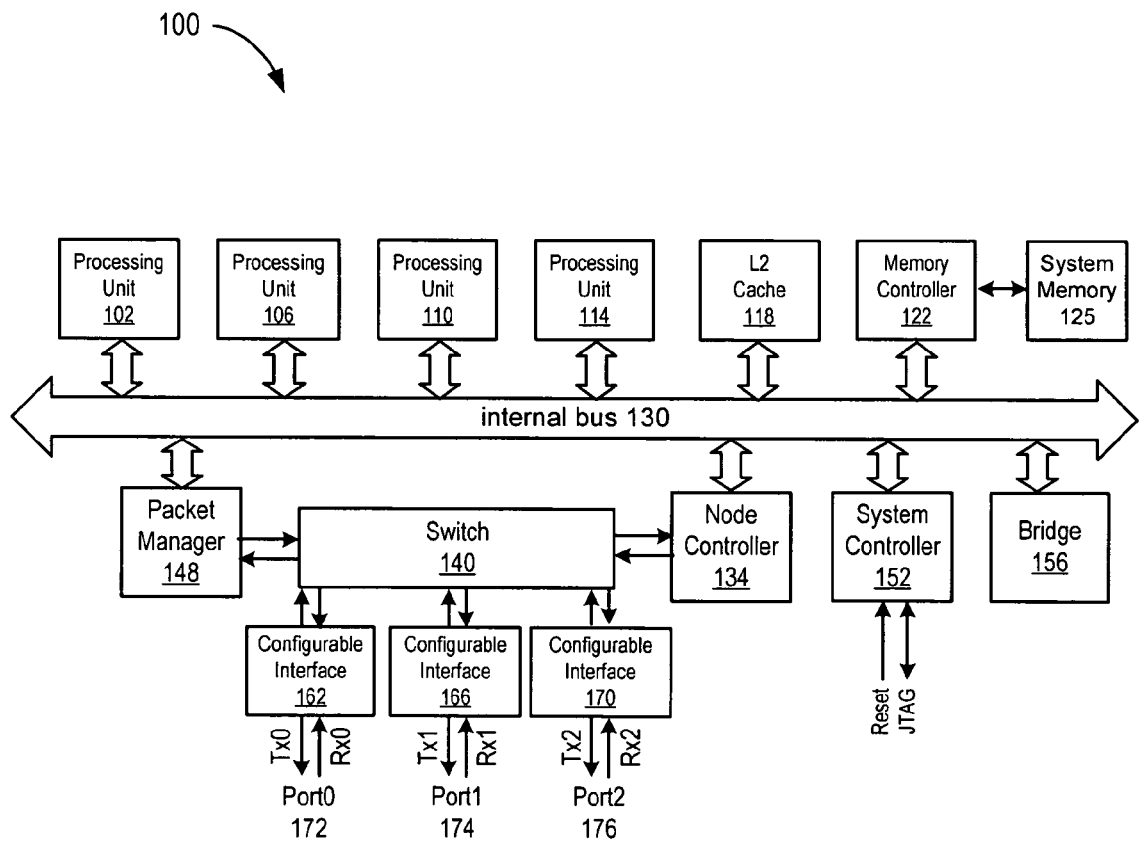
FIG. 1 is a block diagram of a network multiprocessor switching system-on-a-chip.

An apparatus and method in accordance with the present invention provide a system for routing incoming packets through a multiprocessor switching system-on-a-chip. FIG. 1 is a system level block diagram of a multiprocessor switching system 100 that may be contained in a single integrated circuit. The multiprocessor device 100 includes a plurality of processing units 102, 106, 110, 114, L2 cache memory 118, memory controller 122, which interfaces with on and/or off-chip system memory 125, an internal bus 130, a node controller 134, a switching module 140, a packet manager 148, a system controller 152 and a plurality of configurable packet based interfaces 162, 166, 170, such as three flexible Hyper-Transport/SPI-4 Phase 2 links.

As shown in FIG. 1, the four processors 102, 106, 110, 114 are operably connected to the internal bus 130. The processors 102, 106, 110, 114 may be designed to implement any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. Each processing unit 102, 106, 110, 114 may include a memory sub-system (level 1 cache) of an instruction cache and a data cache and may support separately, or in combination, one or more processing functions.

The internal bus 130 may be any form of communication medium between the devices coupled to the bus. For example, the bus 130 may include shared buses, crossbar connections, point-to-point connections in a ring, star, or any other topology, meshes, cubes, etc. In selected embodiments, the internal bus 130 may be a split transaction bus (i.e., having separate address and data phases). The bus may also support coherency and thus may include a response phase to transmit coherency response information. The bus may employ a distributed arbitration scheme, and may be pipelined. The bus may employ any suitable signaling technique. For example, differential signaling may be used for high speed signal transmission. Other embodiments may employ any other signaling technique (e.g., TTL, CMOS, GTL, HSTL, etc.). In addition, the internal bus 130 may be a high-speed (e.g., 128-Gbit/s) 256 bit cache line wide split transaction cache coherent multiprocessor bus that couples the processing units 102, 106, 110, 114, cache memory 118, memory controller 122 (illustrated for architecture purposes as being connected through cache memory 118), node controller 134 and packet manager 148 together. The bus 130 may run in big-endian and little-endian modes, and may implement the standard MESI protocol to ensure coherency between the four CPUs, their level 1 caches, and the shared level 2 cache 118. In addition, the bus 130 may be implemented to support an input/output bridge interface 156 to provide various input/output functionalities, including generic bus, SMbus, UARTs, GPIO and Ethernet MAC.

In one embodiment of the invention, the internal bus 130 of the multiprocessor device 100 is implemented using a "snoopy" protocol for maintaining memory coherency. In various alternate embodiments of the invention, the internal bus 130 can be implemented using various directory-based coherency protocols as will be discussed hereinbelow.

The system 100 is illustrated with four processors but may include any number of processors. As will be understood by those of skill in the art, however, management of data transfer between multiple processors using certain memory coherency protocols creates a significant limitation on the number of processors that can be managed on a single bus. For example, if bus 130 is implemented using a "snoopy" protocol, a maximum of four processors can be managed effectively.

The cache memory 118 may function as an L2 cache for the processing units 102, 106, 110, 114, node controller 134 and/or packet manager 148. The memory controller 122 provides an interface to system memory, which, when the multiprocessor device 100 is an integrated circuit, may be off-chip and/or on-chip. The L2 cache 118 may be coupled to the bus 130 for caching various blocks from the system memory for more rapid access by agents coupled to the bus 130. The memory controller 122 may be designed to access any of a variety of types of memory. For example, the memory controller 122 may be designed for synchronous dynamic random access memory (SDRAM), and more particularly double data rate (DDR) SDRAM. Alternatively, the memory controller 122 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The node controller 134 functions as a bridge between the internal bus 130 and the configurable packet-based interfaces 162, 166, 170. Accordingly, accesses originated on either side of the node controller will be translated and sent on to the other. The node controller also supports the distributed shared memory model associated with the cache coherency non-uniform memory access (CC-NUMA) protocol. In various embodiments of the invention discussed hereinbelow, node controllers and switching modules will be used to implement multiple levels of memory coherency to allow effective high speed management of data between multiple processors on different buses with the integrated circuit.

The packet manager 148 circuitry communicates packets between the interfaces 162, 166, 170 and the system memory, and may be a direct memory access (DMA) engine that writes packets received from the switching module 140 into input queues of the system memory and reads packets from output queues of the system memory to the appropriate configurable packet-based interface 162, 166, 170. The packet manager 148 may include a packet manager input and a packet manager output, each having its own DMA engine and associated cache memory. The cache memory may be arranged as first-in-first-out (FIFO) buffers that respectively support the input queues and output queues.

The packet manager circuit 148 comprises circuitry shared by the interfaces 162, 166, 170. The packet manager may generate write commands to the memory controller 122 to write received packets to the system memory, and may generate read commands to read packets from the system memory for transmission by one of the interfaces 162, 166, 170. In some embodiments, the packet manager 148 may be a more efficient use of hardware than having individual DMA engines for each of the interfaces 162, 166, 170. Additionally, the packet manager may simplify communication on the bus 130, in some embodiments, for packet data transfers. The packet manager 148 may be configured, in some embodiments, to cause a portion of the packet data to be stored into the L2 cache in addition to being stored in memory. In some embodiments, the packet manager 148 may use descriptors to locate the memory locations for reading and writing packet data. The descriptors may be stored in the L2 cache or in main memory. The packet manager 148 may read and write the descriptors as well.

In some embodiments, the interfaces 162, 166, 170 may have dedicated communication paths to the node controller 134 or packet manager 148. However, in the illustrated embodiment, the system 100 employs a switch 140. The switch 140 may selectively couple one of the receive/transmit interfaces 162, 166, 170 to the node controller 134 or packet manager 148 to transfer received data. The switch 140 may selectively couple the packet manager 148 to one of the interfaces 162, 166, 170 to transfer packet data from the packet manager 148 to the interfaces 162, 166, 170 for transmission on the corresponding ports 172, 174, 176. The switch 140 may have request/grant interfaces to each of the interfaces 162, 166, 170 and the packet manager 148 for requesting transfers and granting those transfers. As will be appreciated by those of skill in the art, a receive/transmit interface includes any circuitry configured to communicate on a port according to the protocol defined for the port. The interface may include receive circuitry configured to receive communications on the port and to transmit the received communications to other circuitry internal to the system that includes the interface. The interface may also include transmit circuitry configured to receive communications from the other circuitry internal to the system and configured to transmit the communications on the port.

The switching module 140 functions to direct data traffic, which may be in a generic format, between the node controller 134 and the configurable packet-based interfaces 162, 166, 170 and between the packet manager 148 and the configurable packet-based interfaces. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol. In a selected embodiment, a 256-Gbit/s switch 140 connects the on-chip memory 118 and processors 102, 106, 110, 114 to the three Hyper-Transport/SPI-4 links 162, 166, 170, and provides transparent forwarding of network, ccNUMA access, and HyperTransport packets when necessary.

The configurable packet-based interfaces 162, 166, 170 generally function to convert data from a high-speed communication protocol (e.g., HT, SPI, etc.) utilized between multiprocessor devices 100 and the generic format of data within the multiprocessor devices 100. Accordingly, the configurable packet-based interface 162, 166, 170 may convert received HT or SPI packets into the generic format packets or data words for processing within the multiprocessor device 100, such as by using a receiver interface (which amplifies and time aligns the data received via the physical link and then converts the received protocol-formatted data into data from a plurality of virtual channels having the generic format), hash and route block and receiver buffer for holding the data until a routing decision is made. Packets arriving through receiver interface(s) of the chip can be decoded in either SPI-4 mode (native packet mode) or in HyperTransport (HT) mode, in which case, it uses a special extension called Packet-over-HT (POHT) to transfer the packets. From a logical perspective, both modes provide almost identical services. In addition, the configurable packet-based interfaces 162, 166, 170 may convert outbound (transmit) data of a plurality of virtual channels in the generic format received from the switching module 140 into HT packets or SPI packets, such as by using a transmitter formatter and transmitter interface, which take the incoming packet data chunks from the switch and format them according to the mode it is configured in, and then drive the high-speed formatted stream of data onto the physical link coupling the present multiprocessor device 100 to another multiprocessor device. The particular conversion of packets to generic formatted data performed by the configurable packet-based interfaces 162, 166, 170 is based on configuration information, which, for example, indicates configuration for HT to generic format conversion or SPI to generic format conversion.

The system controller 152 provides interrupts to the interrupt lines in processors 102, 106, 110, 114 and is further coupled to receive interrupt requests from system modules, such as packet manager 152 or packet-based interfaces 162, 166, 170 and from other devices within the system 100 (not shown). In an alternative embodiment described herein, the interrupt mapping function may instead or in addition be provided in the various system modules that generate interrupts, such as the packet manager 152 or packet-based interfaces 162, 166, 170 illustrated in FIG. 1. The system controller 152 may map each interrupt to one of the interrupt lines of processors 102, 106, 110, 114, and may assert an interrupt signal to the selected processor 102, 106, 110, 114. The processors 102, 106, 110, 114 may access the system controller 152 to determine the source of a given interrupt. The system controller 152 may employ any mapping mechanism. In one embodiment, the system controller 152 may comprise a channel register and a source register to map each interrupt request to each processor 102, 106, 110, 114. The channel register identifies to the processor which channels are generating interrupts, and the source register indicates the real source of a channel's interrupt. By using a programmable interrupt controller in the packet manager with interrupt channel and source information stored in configuration status registers, the interrupt mapper can mask events and vector interrupts to their final destination using at most two CSR read operations by the processor, although additional mapping can be done in the system controller 152.

In one embodiment, the interfaces 162, 166, 170 may support a set of virtual channels (VCs) in which packets are transmitted. A virtual channel corresponds to the notion of "port" in the SPI-4 specification, and may be used to provide virtual independent flow of packets. The VC is "virtual" in that all the datapaths, including at the I/Os, are provided through a single physical channel, for example by time-multiplexing multiple flows through a single physical channel. Each virtual channel is defined to flow independently of the other virtual channels, even though the virtual channels may share certain physical resources (e.g., the port 172, 174, 176 on which the packets are flowing). These virtual channels may be mapped to internal virtual channels (also referred to as output virtual channels). The datapaths of the high-speed ports 162, 166, 170, the switch 140, and the packet manager 148 all support virtual channels. That is, the switch may grant a coupling between a source and a destination based not only on the ability of the source to transfer data and the destination to receive data, but also on the ability of the source to transfer data in a particular output virtual channel and the destination to receive data on that output virtual channel. Thus, requests from sources may indicate the destination and the virtual channel on which data is to be transferred, and requests from destinations may indicate the virtual channel on which data may be received. Additionally, in some embodiments, the switch 140 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary.

In one embodiment, the system 100 (and more particularly the processors 102, 106, etc., the memory controller 122, the interfaces 162, 166, etc., the node controller 134, the packet manager 148, the switch 140, the system controller 152 and the bus 130) may be integrated onto a single integrated circuit as a system on a chip configuration. Additional circuitry (such as PCI interfaces, serial interfaces, Personal Computer Memory Card International Association (PCMCIA) interfaces, etc.) may also be integrated. Alternatively, other embodiments may implement one or more of the devices as separate integrated circuits. In another configuration, the system memory may be integrated as well. Alternatively, one or more of the components may be implemented as separate integrated circuits, or all components may be separate integrated circuits, as desired. Any level of integration may be used. The system 100 may be designed to take advantage of the integration by tightly coupling the components to provide high performance packet processing. Specifically, the processors 102, 106, etc., the L2 cache 118, the memory controller 122, and the packet interface circuits 162, 166, 170 may be tightly coupled to receive packets, process them, and forward the packets on (if necessary).

As will be understood by those of skill in the art, the multiprocessor device 100 of the present invention provides multiprocessing functionality on its own which makes it suitable for scientific and embedded applications requiring significant computational capabilities. In a selected embodiment, the multiprocessor device 100 of the present invention contains a number of peripherals along with its sophisticated memory and communication support. For example, in a selected embodiment, the processor cores (e.g., 102) are 0.8 to 1.2-GHz, 64-bit MIPS with 64 kbytes of level one cache memory per processor and 1 Mbyte of level two cache 118 per chip; an 800-MHz DDR controller 122; off-chip ccNUMA support and optional ECC support. Three 8/16-bit receive/transmit ports 162, 166, 170 are also provided that are configurable as either HyperTransport or SPI-4 links.

In addition to providing stand alone computational functions, the multiprocessor devices 100 may also be used in communication-oriented applications that need significant computational support, like an array of HyperTransport linked chips for use with Internet service routers and switches with deep content switching and differentiated services such as quality-of-service (QoS) and virtual private networks (VPNs). The multiprocessor devices 100 may also be used in Internet-Protocol (IP) servers and subscriber-management platforms, servers supporting high computational requirements for scientific or Enterprise Java environments, and wireless infrastructure equipment. With three ports 172, 174, 176 on the chip, up to eight chips can be connected via the HyperTransport links in a "cube" configuration of nodes, for a 32-processor system.

When used in a HyperTransport linked network, the multiprocessor devices 100 provide a highly integrated nonuniform memory access (NUMA) architecture with low power consumption that multiplexes memory and I/O traffic on the same link. In contrast to conventional symmetrical multiprocessing systems (where all processors have the same memory access time and a bus or switch acts as an interface between processors and the memory subsystem so that cache coherence is maintained by monitoring the bus or the switch traffic), with NUMA, the memory address space is made up of the combined local memory (e.g., system memory 125) from each node in the system. A processor can access its local memory faster than nonlocal memory. NUMA systems have the advantage of being easily expanded, while adding a processor to a conventional SMP shared memory architecture is more difficult because an additional port is needed.

By using a cache-coherent form of NUMA (ccNUMA), on-chip caches can remain up to date even while data moves through the processor/memory interconnect. The on-chip double-data-rate (DDR) memory controller 122 supports the chip's local, off-chip memory, and its HyperTransport links 162, 166, 170 provide ccNUMA support.

Figure 2:
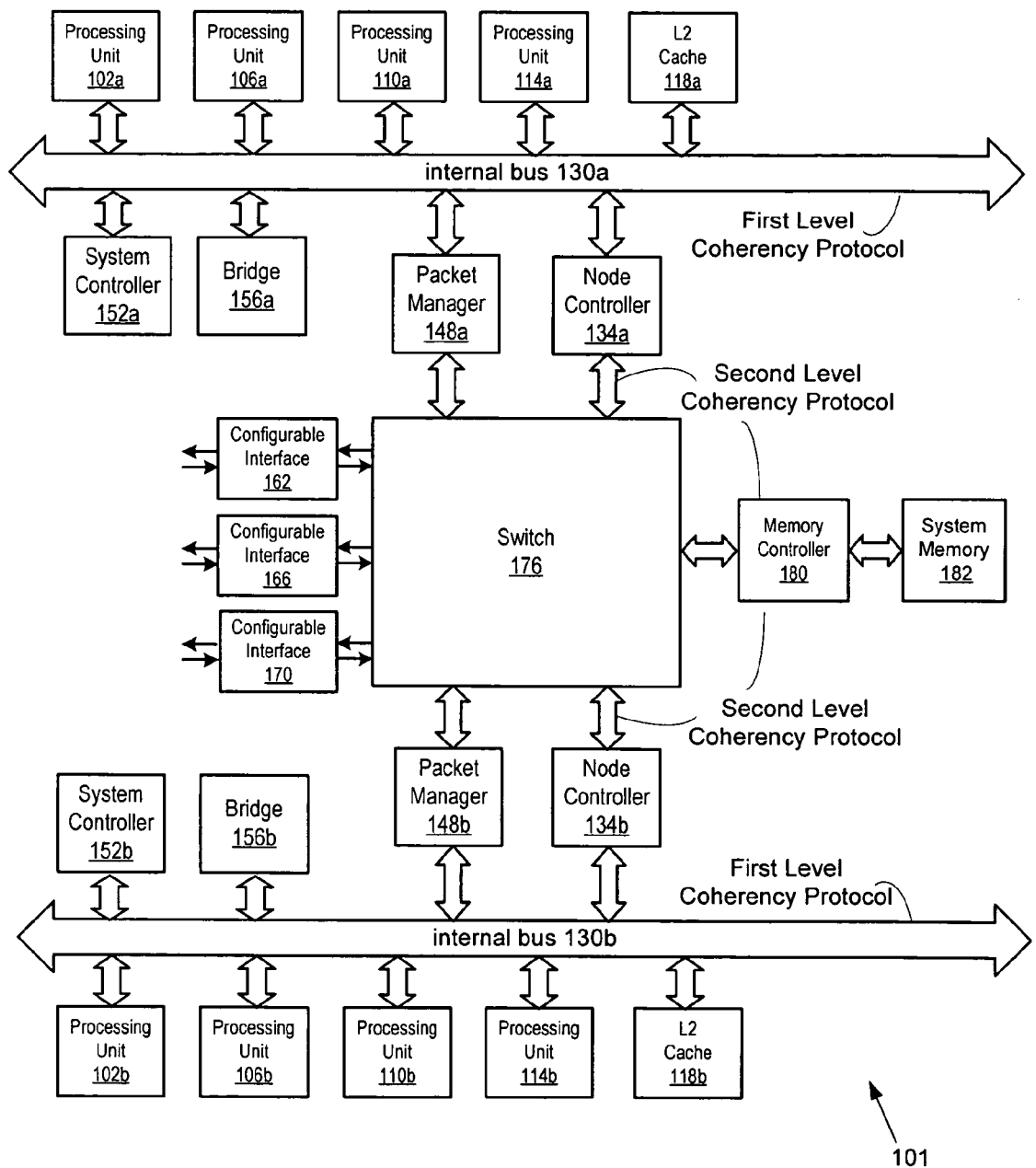
FIG. 2 is a block diagram of one embodiment of the present invention for implementing a plurality of processors on multiple buses in a single integrated circuit using first and second levels of memory coherency.
Figure 3:
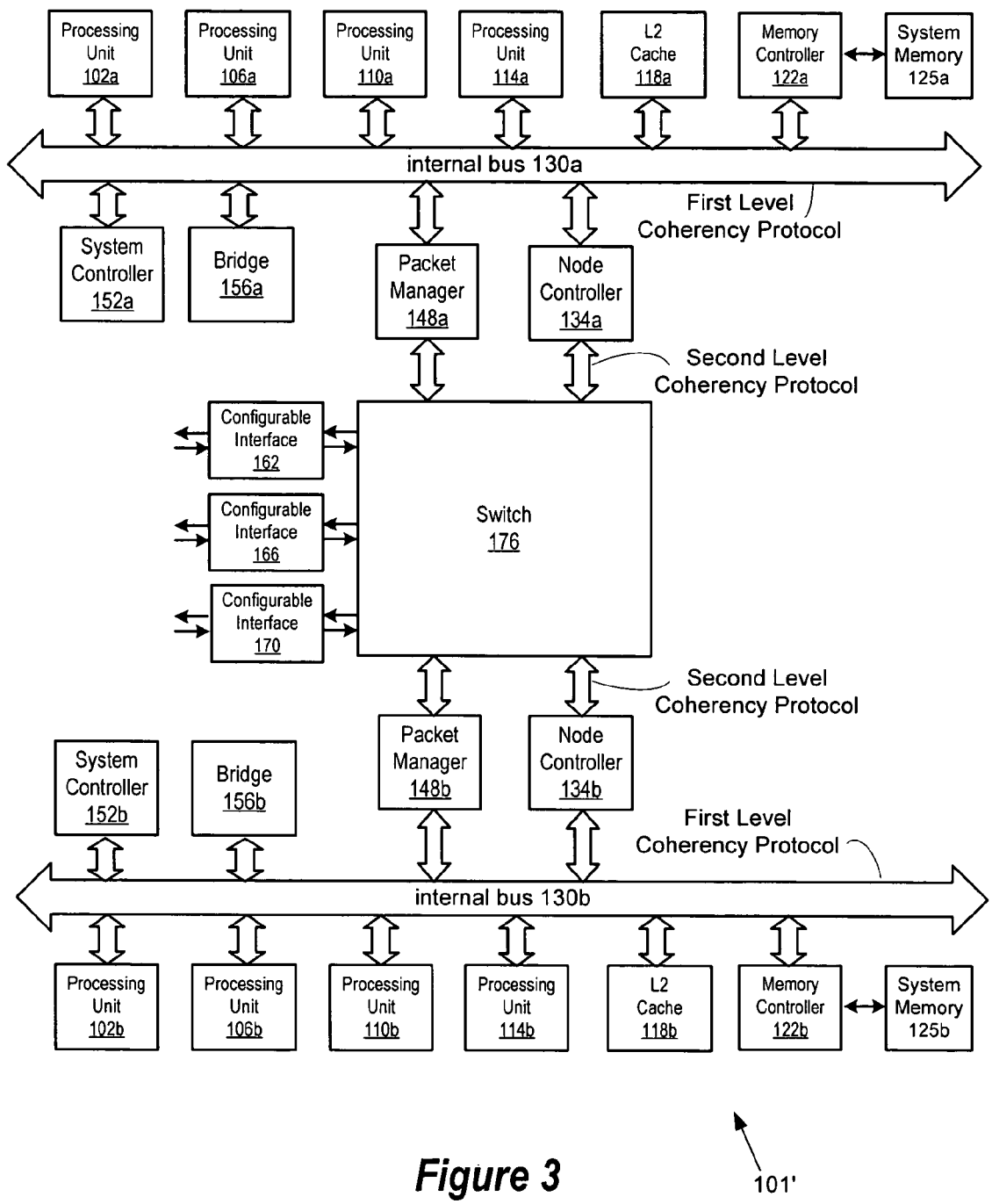
FIG. 3 is a block diagram of an alternate embodiment of the present invention for implementing a plurality of processors on multiple buses in a single integrated circuit using first and second levels of memory coherency.
Figure 4:
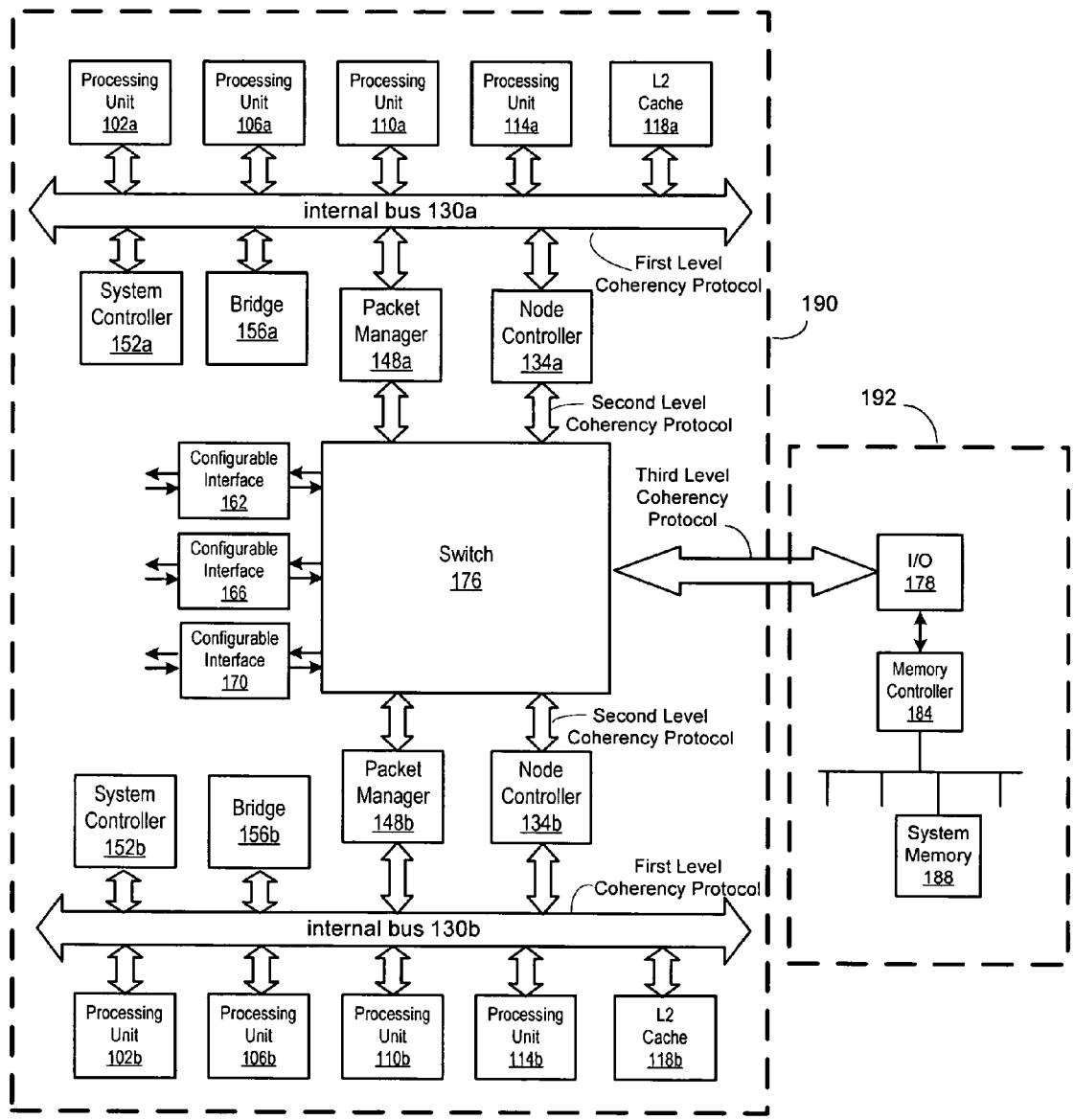
FIG. 4 is a block diagram of another alternate embodiment of the present invention for implementing a plurality of processors on multiple buses in a single integrated circuit using first, second and third levels of memory coherency.

FIGS. 2-4 illustrate various embodiments of the present invention for increasing the number of processors on a single integrated circuit to a number that is larger than would typically be possible to coordinate on a single bus. Each of the embodiments illustrated in FIGS. 2-4 comprise a plurality of processors operably connected to a bus in a configuration similar to that discussed above in connection with FIG. 1. More specifically, in the embodiments disclosed in FIGS. 2-4, the multiprocessor integrated circuit 101 is shown with two buses 130a and 130b, with each of these buses operably connected to a plurality of processing units, memory modules, I/O modules and control modules. Unless otherwise indicated herein, components in FIGS. 2-4 with similar reference numerals perform the same functions as discussed above in connection with FIG. 1. The "a" and "b" designations in FIGS. 2-4 indicate whether a particular module is associated with bus 130a or 130b.

FIG. 2 is an illustration of a first embodiment of the multiprocessor 101 of the present invention wherein a first and second coherency protocols are implemented to increase the number of processors that can be incorporated into a single integrated circuit. The buses 130a and 130b are operably connected to a switch 176 by node controllers 134a and 134b, respectively. The switch 176 is connected to a memory controller 180 that is further connected to system memory 182. In this embodiment of the invention, the first level of coherency protocol implemented on buses 130a and 130b comprises a "snoopy" protocol. A second level of coherency is implemented between the node controllers 134a and 134b and the system memory 182 connected to the switch 176 via the memory controller 176. In various embodiments of the invention, this second level of coherency is implemented using a directory-based protocol. In the embodiment of the invention illustrated in FIG. 2, the directory-based protocol is implemented using centralized memory with a centralized directory maintained in the memory controller 180.

Memory reads and writes for transactions initiated on either of the internal buses 130a, 130b may be completed within the first level of coherency protocol if the desired data resides in the L2 caches 118a, 118b. If, however, it is necessary to access system memory 182 via the memory controller, the transaction will be handled by the respective node controllers 134a, 134b, wherein the transaction will traverse the first level of coherency protocol into the second level of coherency protocol as illustrated in FIG. 2.

FIG. 3 is another embodiment of the present invention for a multiprocessor 101' wherein a first and second coherency protocols are implemented to increase the number of processors that can be incorporated into a single integrated circuit. The embodiment illustrated in FIG. 3 comprises all of the system modules discussed above in connection with FIG. 2. In addition, however, the buses 130a and 130b are operably connected to memory controllers 122a and 122b that are further connected to system memories 125a and 125b, respectively. In this embodiment of the invention, the first level of coherency protocol implemented on buses 130a and 130b also comprises a "snoopy" protocol. The second level of coherency is implemented between the node controllers 134a and 134b and the system memory 182 connected to the switch 176 via the memory controller 176. This second level of coherency is implemented using a directory-based protocol. In the embodiment of the invention illustrated in FIG. 2, the directory-based protocol can be implemented using distributed memory with a distributed directories maintained in the respective memory controllers.

The directory-based protocols implemented in the second coherency levels of the embodiments of the invention discussed above are compatible with the snoopy protocol implemented in the first coherency levels. Since it is implemented on a local basis, it is possible to have higher bandwidth between the two clusters can be achieved between the processors inside the integrated circuit and processors that are external to the integrated circuit. It is also possible, however, to implement the present invention in conjunction with processors and memory in an external integrated circuit.

Memory reads and writes for transactions initiated on either of the internal buses 130a, 130b may be completed within the first level of coherency protocol if the desired data is contained in the L2 caches 118a, 118b. The transaction can also be completed in the first level of coherency protocol if it initiates on a system module on one of the buses 130a or 130b and the system memory that stores the needed data also resides on the same bus. For example, if a transaction initiated by processing unit 102a requires data stored in system memory 125a, but not available in cache 118a, the transaction can be completed via memory controller 122a within the first level of coherency protocol. If however, the transaction requires data stored in system memory 125b, the transaction will proceed via the node controller 134a, switch 176, node controller 134b and memory controller 125b. The transaction will, therefore, traverse from the first level of coherency protocol, e.g. the snoopy protocol of bus 130 and the second level of coherency protocol between the node controllers 134a and 134b.

FIG. 4 is an illustration of an embodiment of the present invention for a multiprocessor 101" wherein a first and second coherency protocols are implemented to increase the number of processors that can be incorporated into a single integrated circuit and a third level of coherency is implemented for data transfer with an external integrated circuit. The embodiment illustrated in FIG. 4 comprises substantially the same system modules discussed above in connection with FIGS. 2 and 3, with all of these system modules being contained in a single integrated circuit 190. An external integrated circuit 192 comprises an I/O module 178, a memory controller 184, at least one processing unit 186 and system memory 188. The switch 176 in the integrated circuit 190 is operably connected to the I/O module 178 in the external integrated circuit 192. In this embodiment of the invention, the first level of coherency protocol implemented on buses 130a and 130b comprises a "snoopy" protocol. The second level of coherency is implemented between the node controllers 134a and 134b and the switch 176 using a directory-based protocol. The third level of coherency protocol is implemented between the switch 176 and the system memory 188 via the I/O 178 and memory controller 184. The third level of coherency protocol implemented in this embodiment of the invention is a directory-based protocol and can be implemented using either centralized memory and a centralized directory or by using distributed memory and distributed directories.

Memory reads and writes for transactions initiated on either of the internal buses 130a, 130b may be completed within the first level of coherency protocol if the desired data is contained in the L2 caches 118a, 118b. If, however, it is necessary to access system memory 188 via the memory controller 184, the transaction will be handled by the respective node controllers 134a, 134b, wherein the transaction will traverse the first level of coherency protocol into the second level of coherency protocol as illustrated in FIG. 4. The transaction will also traverse the third level of coherency protocol between the switch 17 and the system memory 188.

Figure 5:
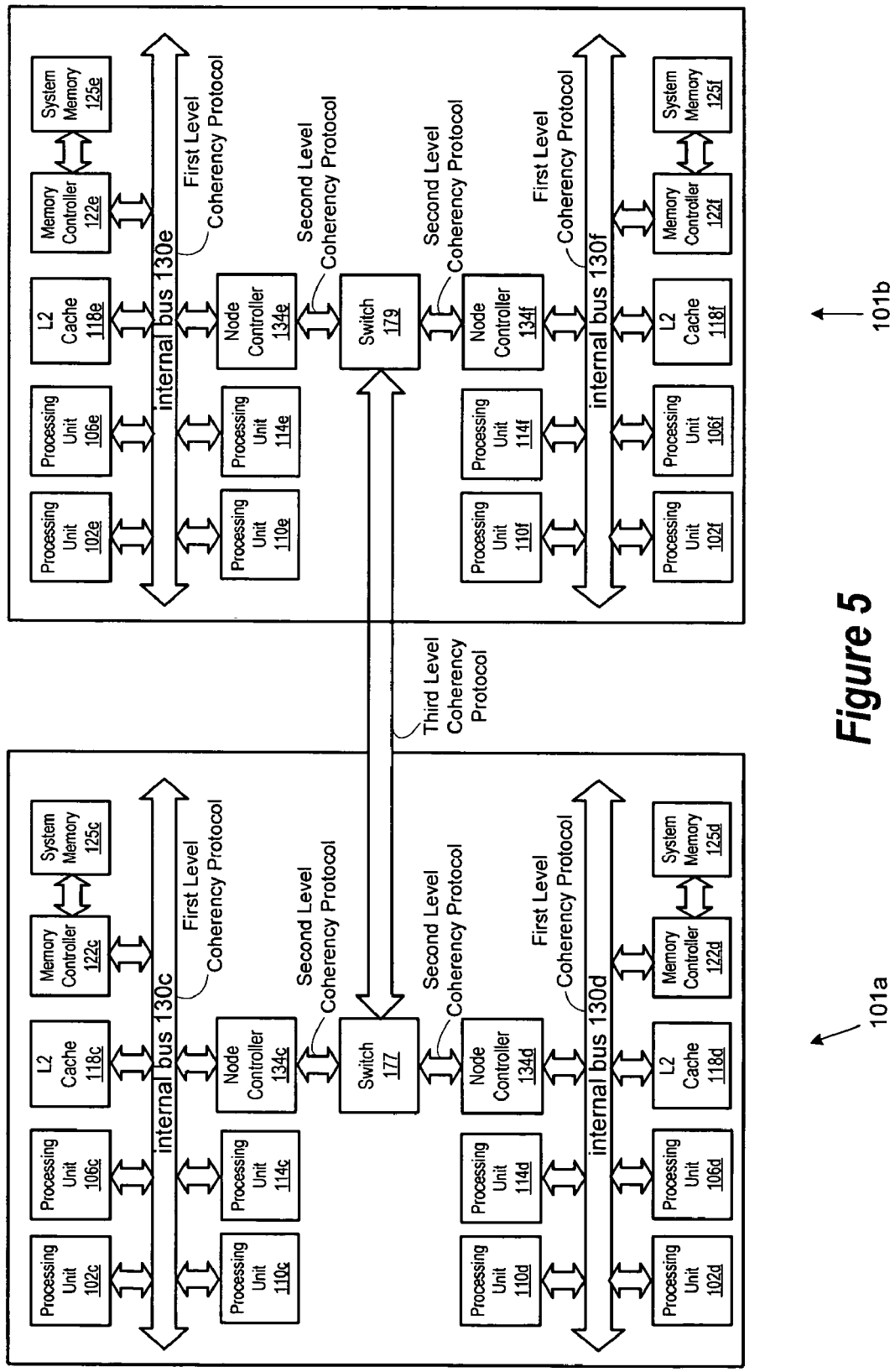
FIG. 5 is a block diagram of another alternate embodiment of the present invention for implementing a plurality of processors on multiple buses in multiple integrated circuit using first, second and third levels of memory coherency.

FIG. 5 is an illustration of an embodiment of the present invention for establishing multiple levels of coherency protocol for managing transactions between a plurality of processors in different integrated circuits 101a and 101b. Although each of the integrated circuits 101a and 101b can contain the various component modules described in connection with FIGS. 1-4, only the processors, node controllers, switches and memory components have been shown for purposes of simplifying the illustration. As can be seen in FIG. 5, integrated circuit 101a comprises first and second buses 130c and 130d, respectively, with a plurality of processing units operably connected thereto. Specifically, integrated circuit 101a comprises internal bus 130c with processing units 102c, 106c, 110c, and 114c operably connected thereto. The internal bus 130c is also operably connected to an L2 cache 118c and to a memory controller 122c that is further connected to system memory 125c. Transactions originating in one of the processing entities on internal bus 130c can be communicated to processing entities on internal bus 130d or to processing entities on internal buses 130e, 130f via the node controller and the switch 177 as discussed in more detail hereinbelow. The internal bus 130d in integrated circuit 101a comprises functional modules substantially identical to those discussed in connection with internal bus 130c, although for purposes of brevity the specific connections will not be further discussed herein. Furthermore, internal buses 130e and 130f of integrated circuit 101a are operably connected to components substantially similar to those discussed hereinabove in connection with internal bus 130c.

Memory reads and writes for transactions initiated on either of the internal buses 130c, 130d of integrated circuit 101a may be completed within the first level of coherency protocol if the desired data is contained in the L2 caches 118a, 118b or system memory 125c, 125d associated with the respective busses. If, however, it is necessary to access system memory on another bus, the transaction will traverse the first level or protocol into the second level of protocol. For example if a transaction initiated by processing unit 102c on bus 130c requires data stored in system memory 125d on bus 130d, the transaction will be controlled by the node controllers 134c, 134d and the switch 177. The transaction will be managed by the first levels of coherency protocols on the respective buses 130c and 130d and will also be managed by the second level of protocol as the transaction is transferred between the node controllers 134c, 134d and the switch 177. If a transaction initiated by one of the processing units on bus 130 requires data contained in one of the system memory units 125e or 125f on bus 130e or 130f, resectively of integrated circuit 101a, the transaction can be completed by traversing the first and second coherency protocols as described hereinabove and also by traversing a third level of coherency protocol defined by the connection between switches 177 and 179.

As discussed hereinabove, in connection with the other embodiments of the invention, the first level of coherency protocol can be implemented using a "snoopy" protocol. The second level of coherency is implemented between the various node controllers and the respective switches can be implemented using a directory-based protocol. The third level of coherency protocol implemented in this embodiment of the invention is a directory-based protocol and can be implemented using either centralized memory and a centralized directory or by using distributed memory and distributed directories.

As will be appreciated, the present invention may be implemented in a computer accessible medium including one or more data structures representative of the circuitry included in the system described herein. Generally speaking, a computer accessible medium may include storage media such as magnetic or optical media, e.g., disk, CD-ROM, or DVD-ROM, volatile or non-volatile memory media such as RAM (e.g., SDRAM, RDRAM, SRAM, etc.), ROM, etc., as well as media accessible via transmission media or signals such as electrical, electromagnetic, or digital signals, conveyed via a communication medium such as a network and/or a wireless link. For example, data structure(s) of the circuitry on the computer accessible medium may be read by a program and used, directly or indirectly, to implement the hardware comprising the circuitry described herein. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium may be the netlist(s) (with or without the synthesis library) or the data set(s), as desired. In yet another alternative, the data structures may comprise the output of a schematic program, or netlist(s) or data set(s) derived therefrom. While a computer accessible medium may include a representation of the present invention, other embodiments may include a representation of any portion of the multiprocessor system and/or the descriptor write-back circuitry (e.g., processors, memory controller, bus, packet manager circuit (or portions thereof), switch, receive/transmit interface circuits (or portions thereof), etc.).

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A data processing system, comprising:
a first integrated circuit, comprising:
at least one memory module;
a first bus having a first memory coherency protocol for managing data transfers therein;
a first plurality of processors operably coupled to said first bus;
a second bus having said first memory coherency protocol for managing data transfers therein;
a second plurality of processors operably coupled to said second bus; a switch operably coupled to said memory module;
a first controller for operably coupling said first bus to said switch, thereby establishing a first level of coherency between individual processors in said first plurality of processors using said first memory coherency protocol and a second level of coherency between individual processors in said first plurality of processors and individual processors in said second plurality of processors using a second memory coherency protocol; and
a second controller for operably coupling said second bus to said switch, thereby establishing said first level of coherency between individual processors in said second plurality of processors using said first memory coherency protocol and said second level of coherency between individual processors in said second plurality of processors and individual processors in said first plurality of processors using said second memory coherency protocol.

2. The data processing system according to claim 1, wherein said first
coherency protocol comprises a snoopy protocol.

3. The data processing system according to claim 1, wherein said second
coherency protocol comprises a directory-based protocol.

4. The data processing system according to claim 3, wherein said
directory-based protocol is implemented using a centralized memory and a centralized directory.

5. The data processing according to claim 3, wherein said directory-based protocol is implemented using distributed memory and a distributed directory.

6. The data processing according to claim 1, wherein said first
plurality of processors comprises at least four processors.

7. The data processing according to claim 6, wherein said second
plurality of processors comprises at least four processors.

8. The data processing according to claim 1,
wherein:
said memory module is contained in a second integrated circuit external to said first
integrated circuit;
said switch in said first integrated circuit is operably coupled to a memory controller operable to control said memory module; and
said coupling between said switch and said memory controller is implemented using a third level of memory coherency.

9. The data processing it according to claim 8, wherein said third level of memory coherency is a directory based coherency protocol.

10. The data processing according to claim 9, wherein said directory-based protocol for said third level of memory coherency is implemented using a centralized memory and a centralized directory.

11. The data processing according to claim 9, wherein said directory-based protocol for said third level of memory coherency is implemented using distributed memory and a distributed directory.

12. A data processing system, comprising:
a first integrated circuit comprising:
a first memory module;
a first bus having a first memory coherency protocol for managing data transfers
therein;
a first plurality of processors operably coupled to said first bus;
a second bus having said first memory coherency protocol for managing data
transfers therein;
a second plurality of processors operably coupled to said second bus; a first switch; a first controller for operably coupling said first bus to said switch, thereby
establishing a first level of coherency between individual processors in said first plurality of processors using said first memory coherency protocol and a second level of coherency between individual processors in said first plurality of processors and individual processors in said second
plurality of processors using a second memory coherency protocol; and a second controller for operably coupling said second bus to said switch, thereby
establishing said first level of coherency between individual processors in said second plurality of processors using said first memory coherency protocol and said second level of coherency between individual processors in said second plurality of processors and individual processors in said first plurality of processors using said second memory coherency protocol; and
a second integrated circuit comprising: a second memory module; a third bus having a first memory coherency protocol for managing data transfers
therein;
a third plurality of processors operably coupled to said third bus;
a fourth bus having said first memory coherency protocol for managing data
transfers therein;
a fourth plurality of processors operably coupled to said fourth bus
a second switch;

a third controller for operably coupling said third bus to said switch, thereby establishing said first level of coherency using said first memory coherency protocol and said second level of coherency using a second memory coherency protocol; and a fourth controller for operably coupling said fourth bus to said switch, thereby establishing said first level of coherency using said first memory coherency protocol and said second level of coherency using said second memory coherency protocol;

wherein said first and second switches of said first and second integrated circuits are operably coupled to establish a third level of coherency protocol for managing a data transaction between one of said processors in said first integrated circuit and said memory module in said second integrated circuit.

13. The data processing system according to claim 12, wherein said first
coherency protocol comprises a snoopy protocol.

14. The data processing system according to claim 12, wherein said second
coherency protocol comprises a directory-based protocol.

15. The data processing system according to claim 14, wherein said
directory-based protocol comprises a centralized memory and a centralized directory.

16. The data processing system according to claim 14, wherein said
directory-based protocol comprises distributed memory and a distributed directory.

17. The data processing system according to claim 12, wherein said first and
second plurality of processors comprises at least four processors.

18. The data processing system according to claim 17, wherein said third and
fourth plurality of processors comprises at least four processors.

19. The data processing system according to claim 18, wherein said third
level of memory coherency is a directory based coherency protocol.

20. The data processing system according to claim 19, wherein said directory-based protocol for said third level of memory coherency is implemented using a centralized memory and a centralized directory.

21. The data processing system according to claim 19, wherein said directory-based protocol for said third level of memory coherency is implemented using distributed memory and a distributed directory.

* * * * *